Figure 1:
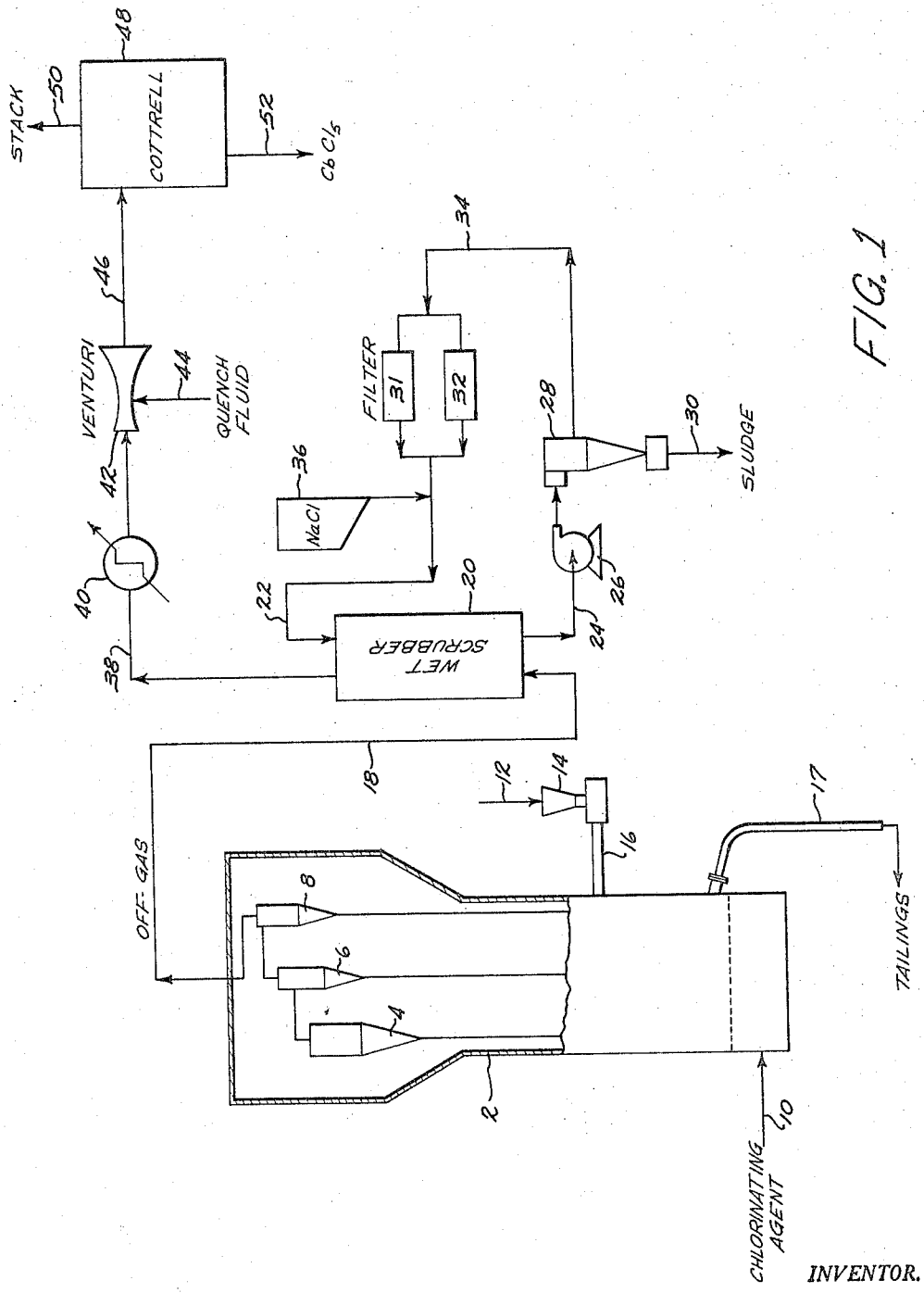

Dec. 27, 1966   B. J. LERNER   3,294,482
PROCESS FOR RECOVERING METAL CHLORIDES FROM GASEOUS MIXTURES
Filed Jan. 28, 1963   2 Sheets-Sheet 1

INVENTOR.
BERNARD J. LERNER
BY
ATTORNEY

United States Patent Office 3,294,482
Patented Dec. 27, 1966

3,294,482
PROCESS FOR RECOVERING METAL CHLORIDES FROM GASEOUS MIXTURES
Bernard J. Lerner, O'Hara Township, Allegheny County, Pa., assignor to Dominion Gulf Company, Pittsburgh, Pa., a corporation of Delaware
Filed Jan. 28, 1963, Ser. No. 254,349
10 Claims. (Cl. 23—15)

This invention relates to a method for fractionally separating normally solid metal chlorides from a mixture of gases formed by chlorinating metalliferous ores.

In the recovery of metals that form volatile chlorides, such as columbium metal, from the iron-containing ores of such metals by reductive chlorination of such ores, there is often encountered the problem of separating the desired metal chlorides, which term is used herein in its broader sense to include oxychlorides, from the mixture of off-gases formed by chlorination of the metal-bearing ores. In the case of columbium chlorides, it is important that ferric chloride be separated from the columbium chlorides as completely as possible, prior to purification of the latter, as ferric chloride vapor is very corrosive and can lead to contamination of the purified columbium halides with its corrosion products. Also, if the ferric chloride is not selectively separated from the columbium chlorides in a primary product collection system, it must then be removed during purification of the subsequently condensed columbium chlorides. This is undesirable, as the principal contaminants of the ultimate, purified columbium pentachloride product are corrosion products of ferric chloride generated during such purification procedure. Accordingly, the less ferric chloride present in the columbium pentachlorides prior to purification of the latter, the better the final product.

Selective separation of the ferric chloride in a first product collection stage by fractional condensation during contact with a cooled surface is not entirely satisfactory unless extremely close temperature control is exercised because ferric chloride forms a solid, hard, corrosive, insulating layer on the heat-exchange surfaces employed, as a result of which heat transfer is poor, lines become plugged and maintenance costs are increased, and because of the possibility of co-condensing columbium chlorides. In addition, separation of columbium chlorides from the ferric chloride-free chlorination gases by contact with a cooled surface is also undesirable, since the liquidus range of the product is rather narrow, whereby very close temperature control is required, and because of the presence in the columbium chlorides of columbium oxychloride, which is a solid material at temperature conditions under which columbium pentachloride is a liquid, and in view of the relatively high cost of heat-exchange surface. Similar problems are also encountered in condensing the normally solid metal chlorides obtained from other iron-containing ores of such metals.

The present invention relates to a process for recovering iron-free, normally solid, metal chlorides, such as columbium chlorides, from the hot gases produced by chlorination of iron-containing ores of such metal, whereby the use of heat-exchange surfaces to separate the iron and metal chlorides and the difficulties attendant thereto are avoided, and where close temperature control during such separation is not a problem. Broadly speaking, the process of this invention involves separating ferric chloride, together with any entrained solids, from the hot chlorination gases in a primary product recovery stage by scrubbing such hot gases with an at least partly molten mixture of ferric chloride and sodium chloride at a substantially constant temperature above the condensation point of said normally solid metal chlorides, and then effecting a vapor-phase condensation of the metal chlorides remaining in the off-gases from the scrubbing operation by admixture with a quench fluid, such as liquid phosgene or carbon dioxide, or other materials, at a temperature sufficient to reduce the temperature of such off-gases below the solidification temperature of the metal chlorides, and separating the condensed metal chlorides from the uncondensed gases. The scrubbing medium may be entirely molten or it may contain solid sodium chloride or solid ferric chloride suspended therein.

Figure 2:
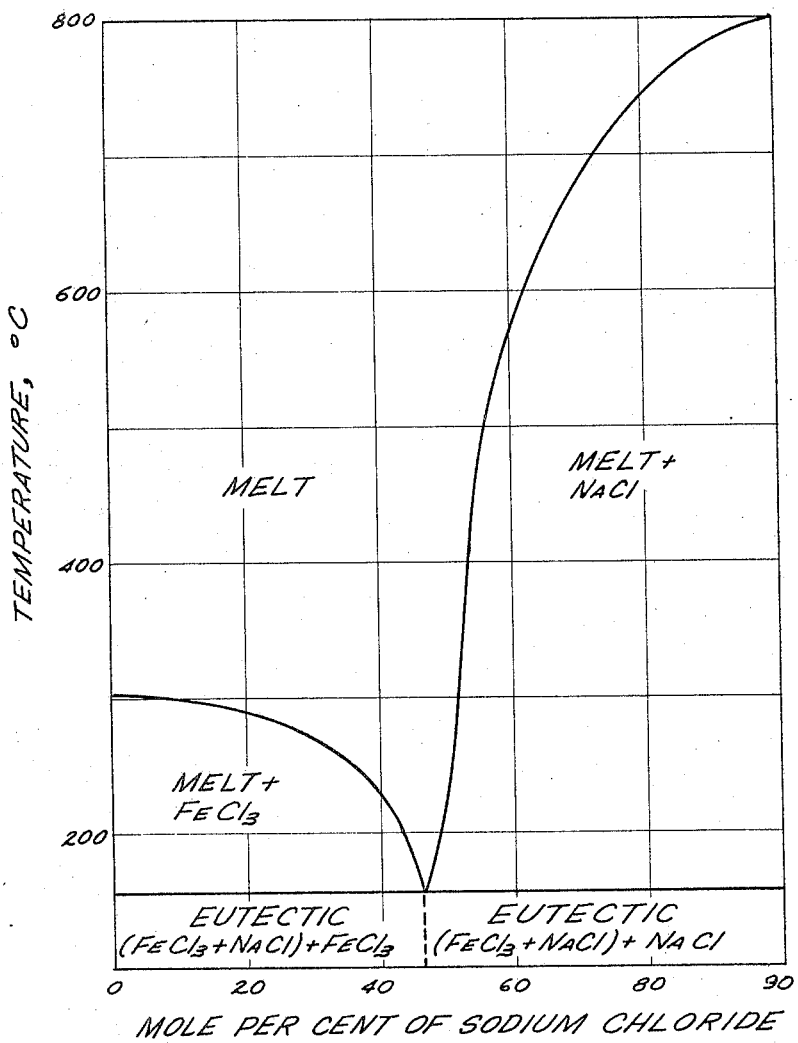

Referring briefly to FIGURE 1 of the drawings, there is shown in diagrammatic form a process scheme for reductively chlorinating a columbium-bearing ore and for successively separating ferric chloride and columbium chlorides therefrom in accordance with the principles of this invention. FIGURE 2 is a phase diagram of the ferric chloride-sodium chloride system.

The initial wet scrubbing operation is carried out by countercurrent contact between an at least partly molten mixture of ferric chloride and sodium chloride and the gaseous products obtained by chlorination of the metal-bearing ore in a wet scrubbing tower provided with suitable perforated trays, baffles or packing effective to produce intimate gas-liquid contact. The scrubbing operation described is carried out at essentially constant temperature and is not dependent on any heat cycle for its effect. Constant temperature operation can be achieved by adjusting the liquid-gas ratio in the scrubbing tower so that there is no significant temperature rise in the scrubbing medium during the scrubbing operation. By operating in this way, no cooling means are required to remove heat from the scrubbing medium and no reduction is suffered in the solubility of the $FeCl_3$ in the scrubbing medium during the scrubbing operation.

During gas-liquid contact, the ferric chloride contained in the chlorination gases is removed therefrom by solution or condensation in the scrubbing medium. At the same time, any entrained particles of unreacted ore or other solids are effectively washed from the gases. Any mixture of ferric chloride and sodium chloride that is at least partly liquid at the scrubbing temperature can be used as the scrubbing liquid. As is known, ferric chloride and sodium chloride can be combined in various proportions to form an at least partly molten mixture at temperatures above the eutectic point, 158° C., which is reached by a mixture containing 46.0 mol percent sodium chloride. When it is desired to operate using a completely liquid scrubbing medium, a scrubbing temperature in excess of 158° C. should be used, and the rates of circulation of the gases to be scrubbed and the scrubbing medium should be operated so that the mol fractions of sodium chloride and ferric chloride in the mixture at the scrubbing temperature employed will not exceed those values on the $FeCl_3$-NaCl phase diagram permitting a wholly liquid phase mixture to exist. When the scrubbing temperature is above the melting point of ferric chloride, approximately 300° C., a wholly liquid phase mixture may be maintained solely by operating the system so that the mol fraction of sodium chloride does not exceed that value on the $FeCl_3$-NaCl phase diagram permitting a wholly liquid phase melt to exist. It is also possible to operate the scrubbing system at temperatures below 300° C. and at sodium chloride mol fractions less than 0.46, such that at the temperature selected, solid ferric chloride will be present in the melt. Similarly, the system can be operated with solid sodium chloride present in the melt at sodium chloride mol fractions greater than 0.46, and such that at the temperature selected, undissolved sodium chloride will be present. Since the vapor pressure of ferric chloride in admixture with sodium chloride diminishes rapidly at concentrations above 40 mol percent sodium chloride, it is preferred to operate at NaCl mol fractions greater than 0.4. Since it is impossible to vaporize ferric chloride from a molten mixture of the salts containing undissolved sodium chloride, this method of operation offers the possibility of the greatest degree of removal of ferric chloride from the chlorination gases. Although molten salt-mixtures having low vapor pressures can be prepared up to about 800° C., it is normally preferred to effect the scrubbing operation at about the temperature at which the chlorination gases emerge from the chlorination reactor. According to the preferred chlorination method, such temperatures will be in the range of about 315° to 400° C., but other temperatures can be used. When the preferred scrubbing temperatures are employed, a wholly liquid phase can be maintained in the scrubber when the NaCl mol fraction in the mixture is maintained below about 0.5, and undissolved sodium chloride can be maintained in the molten salt mixture by maintaining the NaCl mol fraction above about 0.53.

As the scrubbing medium is circulated through the scrubbing tower, it becomes progressively richer in ferric chloride. Also, the liquid acquires an increasing content of entrained, insoluble particles. In order to prevent overburdening of the scrubbing liquid with solid particles, the dust particles and at least a portion of any solid ferric chloride particles that may be present are continuously removed from the scrubbing liquid prior to recycling, for example, by mechanical means such as gravity or centrifugal separation. Under this method of operation no addition of fresh sodium chloride is required. When the "rich" scrubbing medium is a wholly liquid material (except for entrained dust particles), the dust particles can be removed by gravity or centrifugal separation and/or by filtration. Fresh sodium chloride is then added to the scrubbing medium to restore the desired sodium chloride mol fraction in the mixture. The system can also be operated in similar fashion when scrubbing is carried out with solid sodium chloride in the scrubbing medium. Since solid sodium chloride will be removed from the scrubbing medium along with entrained dust particles, it is preferred to operate the scrubbing operation so that the "rich" scrubbing liquid contains little or no solid sodium chloride, although the "lean" scrubbing mixture may well contain solid sodium chloride, because of the advantages obtainable thereby with respect to removal of ferric chloride from the gaseous chlorination products being subjected to scrubbing.

While the above-described scrubbing operation has been described solely with reference to ferric chloride removal from the gaseous chlorination products, it will be understood that other sublimable metal chlorides of similar properties, for example, aluminum chloride, may also be concurrently removed with the ferric chloride.

The ferric chloride-free gases obtained from the above-described scrubbing operation can be treated to remove columbium chlorides, i.e., columbium pentachloride and/or oxychloride, by vapor-phase condensation without danger of dropping out other sublimed solids, e.g., ferric chloride or other similar materials, such as aluminum chloride. The temperature of the gaseous mixture may desirably be reduced to a point just above the dew point of the ferric chloride-free gases by heat exchange, for example, about 235° C., or any other temperature sufficient to avoid precipitation of solids. The purpose of this cooling step is simply to reduce the quantity of quench fluid required, and accordingly, close temperature control is not required. The partly cooled, ferric chloride-free gases are then passed into an in-line venturi mixer, or other suitable contacting device, for mixing with the quench fluid, which, as stated, is at a temperature and in an amount sufficient to cool the gases to a temperature below the condensation temperature of the columbium chlorides. The final temperature of the quenched gases can be any above the dew point of the columbium chloride-free gases. On account of the high volume of high vapor pressure material present after quenching, this temperature can be quite low. Good results are obtainable at 60° C., but even lower temperatures can be used, if desired. Mixing of quench and ferric chloride-free gases is completed in the piping downstream from the mixer.

Any fluid that is inert with respect to the columbium chlorides, that is gaseous at the quenched temperature, and that is compatible with the chlorinating agent employed in the chlorination of the ore, can be used as the quenching fluid. For example, good results can be obtained with carbon dioxide gas. Liquid phosgene also can be used as the quenching fluid, as can still other inert, compatible fluids, such as nitrogen, or metallic or organic halides having boiling points less than that of columbium pentachloride.

Separation of the condensed columbium chlorides from the mixture of uncondensable gases (the gaseous products of chlorination that are not condensable at the quenched gas temperature) and gaseous quench fluid is effected by any suitable means effective to separate gases from finely-divided solid particles. Thus, cyclone separators can be utilized, as a primary separation stage, with electrostatic precipitating means also being utilized to minimize loss of the colloidal-size particles of columbium chlorides to the off-gases. Unreacted chlorinating agent and any valuable, lower-boiling uncondensed chlorides, for example, titanium tetrachloride, silicon tetrachloride or the like, can be recovered from the off-gases by conventional techniques.

Purification of the resulting columbium chlorides and recovery of columbium metal therefrom can be effected in any suitable way. These steps do not form the essence of the present invention and therefore need not be described in detail. However, for purposes of completeness, it may be briefly mentioned that the columbium oxychloride content of the crude columbium pentachloride product can be converted to columbium pentachloride by reductive chlorination with phosgene, carbon tetrachloride or other suitable chlorinating agent, in contact with prechlorinated carbon, at a temperature of 300° to 500° C., as described in the copending United States patent application Serial No. 238,738, filed November 19, 1962, in the name of A. E. Erhard. The resulting columbium pentachloride product can then be reduced to the metal with a reducing agent such as hydrogen, for example, by the procedure described by Oxley et al. in the paper entitled "Fluidized Bed Process for Production of Niobium," presented at the International Congress of Chemical Engineering, Mexico City, Mexico, June 1960.

Chlorination of the columbium-bearing ore can be effected initially by any suitable process. For example, chlorination can be carried out in a fluidized bed of ore, at about 300° to 400° C. with a reductive chlorinating agent such as phosgene or carbon tetrachloride, in a proportion such as to provide about 5 to 20 times the stoichiometric amount of chlorine, as described and claimed in my copending application Serial No. 175,841, filed February 26, 1962. Alternatively, chlorination can be effected at temperatures of the same order of magnitude as indicated above, using chlorine gas and 1 to 10 percent of an iron group metal sulfide catalyst such as iron pyrite, as described and claimed in my copending United States patent application Serial No. 181,774, filed March 22, 1962. In either case, the ore can be activated before chlorination by intimately contacting the same with air or other oxygen-containing gas in the proportion of about 0.1 to 0.2 cubic feet per pound of ore per minute, for about 45 to 65 minutes, at a temperature of about 300° to 450° C.

Referring to the drawing in greater detail, numeral 2 indicates a chlorination reactor in which chlorination of ore takes place. Numerals 4, 6 and 8 refer to a series of cyclone separators for returning entrained ore particles to the fluidized reaction bed. Chlorinating agent is introduced to the reactor 2 by way of line 10, and finely-divided ore particles, preferably activated, are introduced into the reactor by way of line 12, hopper 14, and screw conveyor 16. Ore tailings are removed from the reactor by way of line 17. Line 18 provides a fluid connection for passing reactor off-gases from cyclone separator 8 to the bottom of absorption tower 20. Liquid scrubbing medium is introduced into the top of absorption tower 20 by way of recycle line 22. Ferric chloride-enriched scrubbing liquid is removed from the bottom of tower 20 by way of line 24 and is pumped by recycle pump 26 to hydrocyclone 28, which is provided to separate a sludge or slurry of entrained dust particles and scrubbing liquid. This separated sludge is continuously drawn off through line 30. Scrubbing liquid from which some solids have been removed pass from hydrocyclone 28 to one of a pair of alternately used filters 31 and 32 by way of line 34. A hopper 36, containing sodium chloride, is provided for the purpose of continuously replenishing sodium chloride removed from the system by way of line 30. Line 38 and heat exchanger 40 provide means for partly cooling and transmitting ferric chloride-free chlorination gases to mixer 42. Quench fluid is introduced by way of line 44. Quenched gases, containing colloidal columbium chlorides, pass by way of line 46 to Cottrell electrostatic precipitator 48. Uncondensed gases are removed from precipitator 48 by way of line 50 to auxiliary gas purification equipment, not shown. Solid columbium chlorides are removed from the bottom of precipitator 48 by way of line 52.

In a specific embodiment, 1,000 tons/day of raw pyrochlore ore, having a typical columbium content of 0.40 percent, a calcium carbonate content of about 9.5 percent, and an iron content of about 11 to 12 percent, is ground to a particle size of less than 65 mesh, and activated by contact in a fluidized bed with a fluidizing gas containing 18 percent oxygen and obtained by burning natural gas with 300 percent excess air. The fluidizing gas is introduced to the bed at the rate of 18,000 s.c.f.m., corresponding to a linear gas velocity of 1.1 ft./sec. The activated ore, at a temperature of about 350° C., is fed to a chlorination reactor where it contacts a reductive chlorination agent, phosgene, which is fed to the reactor at the rate of 17,670 lbs./hr., of which 10,280 lbs./hr. is recycled material.

The off-gases from the reactor, at a temperature of about 350° C. and containing unreacted phosgene, carbon dioxide, 752 lbs./hr. $FeCl_3$, 826 lbs./hr. of columbium chlorides ($CbCl_5$ and/or $CbOCl_3$) and negligible amounts of other gases, and containing an unseparated dust content of about 52 lbs./min. are passed to a Peabody scrubber for scrubbing at a temperature of about 350° C. with 15 g.p.m. liquid $NaCl/FeCl_3$, wherein the NaCl mol fraction is about 0.44 and the $FeCl_3$ mol fraction is about 0.56. The dust-molten salt mixture obtained from the scrubbing is pumped through a hydrocyclone to separate about 30 lbs./min. dust in the form of a sludge with the molten salt solutions. The overflow from the hydrocyclone is passed to a Kelly filter with a filter area of 50 square feet, where the remainder of the dust is removed from the molten salt solution. Solid sodium chloride is added to the filtered eutectic at a rate of 230 lbs./hr., which is sufficient to form approximately 1 g.p.m. additional molten salt solution with the $FeCl_3$ load in the gas phase.

The scrubbed gas, which is substantially dust-free and ferric chloride-free, is now cooled to 450° F. by heat exchange, without danger of dropping out sublimed solids other than columbium chlorides. Vapor-phase condensation is then accomplished by quenching the gas to 60° F. by injection of 4,500 lbs./hr. of cold liquid phosgene. The quenched gas, containing colloidal columbium chloride particles, is passed into a Cottrell precipitator for separation of columbium chlorides as a dry powder. Off-gas, containing 14,800 lbs./hr. phosgene and 2,985 lbs./hr. $CO_2$, is removed from the Cottrell precipitator and passed into a recovery system (not shown) for recovery and recycle of phosgene.

The crude columbium chlorides are further refined in a purification train to contain substantially pure columbium pentachloride, as described above. This material is then converted to columbium metal by hydrogenation in the manner previously indicated.

In another embodiment, the ore is chlorinated with 4,580 lbs./hr. chlorine gas in the presence of 5 percent iron pyrite, based on the weight of ore, and the quench gas is cold carbon dioxide gas.

The foregoing embodiments are illustrative only, and it will be understood that good results can also be obtained with other modifications and variations within the scope of the foregoing description. It will also be understood that the process is not limited solely to recovery of columbium chlorides, but that it is also applicable to the recovery of normally solid chlorides of other high melting metals such as tungsten, molybdenum, vanadium and zirconium.

Numerous other modifications and variations of the invention as described herein will suggest themselves to those skilled in the art and such modifications and variations can be resorted to without departing from the spirit and scope of the herein-described invention. Accordingly, the invention is not to be limited by the particular embodiments disclosed herein but only by the scope of the claims appended hereto.

I claim:

1. A process for the recovery of normally solid, volatile metal chlorides selected from the group consisting of columbium, tungsten, molybdenum and zirconium chlorides from a gaseous mixture thereof with ferric chloride, comprising first separating ferric chloride from said mixture by contacting the same with an at least partly molten mixture of ferric chloride and sodium chloride at a substantially constant temperature above the condensation point of said metal chlorides, separating the remaining gas from the molten mixture, effecting selective vapor-phase condensation of the normally solid, volatile metal chlorides remaining in the separator gas by admixture thereof with a quench fluid that is inert with respect to the volatile metal chlorides and that is gaseous at the quenched temperature, said selective vapor-phase condensation being effected at a temperature such as to reduce the temperature of the gas below the solidification temperature of said metal chlorides without condensation of lower boiling chlorides, and separating the condensed metal chlorides from uncondensed gases.

2. The process of claim 1, where the mol fraction of sodium chloride in the ferric chloride-sodium chloride mixture is at least about 0.4.

3. The process of claim 1, where the mol fraction of sodium chloride in the ferric chloride-sodium chloride mixture is at least about 0.4 and where said mixture is wholly liquid.

4. The process of claim 1, where the ferric chloride-sodium chloride mixture is wholly liquid, the mol fraction of sodium chloride in the mixture is in the range of about 0.4 to 0.53, and said substantially constant temperature is in the range of about 315° to 400° C.

5. The process of claim 1, where the ferric chloride-sodium chloride mixture contains solid ferric chloride, the mol fraction of sodium chloride in the mixture is at least about 0.4 and said substantially constant temperature is between about 158° and 315° C.

6. The process of claim 1, where the ferric chloride-sodium chloride mixture contains solid sodium chloride, the mol fraction of sodium chloride in the mixture is greater than 0.44 but not so great that solid sodium chloride will remain in the mixture after absorption of ferric chloride from said gaseous mixture, and said substantially constant temperature is in the range of about 158° to 400° C.

7. The process of claim 1, where the low-boiling metal chlorides are columbium chlorides.

8. A process for the recovery of normally solid, volatile metal chlorides selected from the group consisting of columbium, tungsten, molybdenum and zirconium chlorides from a gaseous mixture thereof with ferric chloride, comprising first separating ferric chloride from said mixture by effecting countercurrent contact of said mixture with a wholly liquid, molten mixture of ferric chloride and sodium chloride at a substantially constant temperature above the dew point of the gaseous mixture and above the melting point of ferric chloride, the mol fraction of the sodium chloride in the mixture being in the range of about 0.4 to 0.53, separating the remaining gas from the molten liquid, withdrawing a portion of said molten mixture from the system, introducing fresh sodium chloride into the remainder of said molten mixture in an amount sufficient to restore the original proportion thereof with respect to ferric chloride and recycling the restored molten mixture for further contact with fresh gaseous mixture, effecting selective vapor-phase condensation of the normally solid, low-boiling metal chlorides remaining in the gaseous mixture that has been contacted with said molten mixture by admixture thereof with a quench fluid that is inert with respect to the volatile metal chlorides and that is gaseous at the quenched temperature, said selective vapor-phase condensation being effected at a temperature such as to reduce the temperature of the gas below the solidification temperature of the low-boiling metal chlorides without condensation of lower boiling chlorides, and separating the condensed metal chlorides from uncondensed gas.

9. A process for the recovery of normally solid, volatile metal chlorides selected from the group consisting of columbium, tungsten, molybdenum and zirconium chlorides from a gaseous mixture thereof with ferric chloride, comprising first separating ferric chloride from said mixture by effecting countercurrent contact of said mixture with a wholly liquid, molten mixture of ferric chloride and sodium chloride at a substantially constant temperature above the dew point of the gaseous mixture and in the range of about 315° to 400° C., the mol fraction of the sodium chloride in the ferric chloride-sodium chloride mixture being in the range of about 0.4 to 0.53, separating the remaining gas from the molten liquid, withdrawing a portion of said molten mixture from the system, introducing fresh sodium chloride into the remainder of said molten mixture in an amount sufficient to restore the original proportion thereof with respect to ferric chloride and recycling the restored molten mixture for further contact with fresh gaseous mixture, cooling the ferric chloride-free gases that have been contacted with said molten mixture by indirect heat exchange to a lower temperature above the dew point of said gases, effecting selective vapor-phase condensation of the normally solid, low-boiling metal chlorides remaining in the gaseous mixture that has been contacted with said molten mixture by admixture thereof with a quench fluid that is inert with respect to the volatile metal chlorides and that is gaseous at the quenched temperature, said selective vapor-phase condensation being effected at a temperature such as to reduce the temperature of the gas below the solidification temperature of the low-boiling metal chlorides without condensation of lower boiling chlorides, and separating the condensed metal chlorides from uncondensed gas.

10. A process of recovering columbium as columbium chlorides from an iron-containing, chemically non-refractory columbium ore, comprising selectively chlorinating the metals in said ore that form volatile chlorides by treatment with a chlorinating agent in a proportion such as to provide from about 5 to 20 times the stoichiometric amount of chlorine required to chlorinate such metals in said ores, at a temperature of about 300° to 400° C. to form a gaseous mixture containing ferric and columbium chlorides, separating ferric chloride from said gaseous mixture by effecting countercurrent contact of said mixture with an at least partly molten mixture of ferric chloride and sodium chloride at a substantially constant temperature above the condensation point of the columbium chlorides, separating the remaining gas from the molten mixture, effecting selective vapor-phase condensation of the normally solid, columbium chlorides in the gaseous mixture that has been contacted with said molten mixture by admixture thereof with a quench fluid that is inert with respect to the volatile metal chlorides and that is gaseous at the quenched temperature, said selective vapor-phase condensation being effected at a temperature such as to reduce the temperature of the gas below the solidification temperature of the columbium chlorides without condensation of lower boiling chlorides, and separating the condensed columbium chlorides from uncondensed gas.

References Cited by the Examiner
UNITED STATES PATENTS

| | | | |
|---|---|---|---|
| 2,533,021 | 12/1950 | Krchma | 23—87 X |
| 2,847,316 | 8/1958 | Michel et al. | 23—87 X |
| 2,905,545 | 10/1959 | Cookston | 23—87 X |
| 2,928,722 | 3/1960 | Scheller | 23—17 |
| 2,940,827 | 6/1960 | Groves | 23—87 |
| 3,066,010 | 1/1962 | Horning et al. | 23—87 |

MILTON WEISSMAN, *Primary Examiner.*

OSCAR R. VERTIZ, *Examiner.*

H. T. CARTER, *Assistant Examiner.*